(12) United States Patent
Williams

(10) Patent No.: US 11,938,420 B2
(45) Date of Patent: Mar. 26, 2024

(54) METHOD AND APPARATUS UTILIZING SOLIDS DISCHARGE PORTS WITH DUMP GATES FOR REMOVING PARTICULATES FROM A FLUID

(71) Applicant: Spinex Pty Ltd, Kelmscott (AU)

(72) Inventor: David Williams, Kelmscott (AU)

(73) Assignee: SPINEX PTY LTD., Kelmscott (AU)

( * ) Notice: Subject to any disclaimer, the term of this patent is extended or adjusted under 35 U.S.C. 154(b) by 940 days.

(21) Appl. No.: 16/954,857

(22) PCT Filed: Jan. 23, 2019

(86) PCT No.: PCT/AU2019/050041
§ 371 (c)(1),
(2) Date: Jun. 17, 2020

(87) PCT Pub. No.: WO2019/157553
PCT Pub. Date: Aug. 22, 2019

(65) Prior Publication Data
US 2021/0086103 A1 Mar. 25, 2021

(30) Foreign Application Priority Data

Feb. 15, 2018 (AU) ................................. 2018900483
Sep. 10, 2018 (AU) ................................. 2018903391

(51) Int. Cl.
*B01D 17/02* (2006.01)
*B04B 1/16* (2006.01)
(Continued)

(52) U.S. Cl.
CPC ............ *B01D 17/0217* (2013.01); *B04B 1/16* (2013.01); *B04B 7/02* (2013.01); *B04B 7/08* (2013.01); *E21B 21/065* (2013.01)

(58) Field of Classification Search
CPC ...... B01D 17/0217; B01D 45/14; B04B 1/16; B04B 7/02; B04B 7/08; E21B 21/065; E21B 21/066
See application file for complete search history.

(56) References Cited

U.S. PATENT DOCUMENTS 2,173,580 A * 9/1939 Fawcett .................. B04B 15/06
494/71
2,321,514 A * 6/1943 Reed ......................... B07B 4/08
209/475
(Continued)

FOREIGN PATENT DOCUMENTS

DE 44 02 041 8/1995
GB 1 412 805 11/1975
(Continued)

OTHER PUBLICATIONS

Extended European Search Report issued in corresponding European Patent Application No. 19753909.1, dated Oct. 22, 2021, 7 pages.
(Continued)

*Primary Examiner* — Walter D. Griffin
*Assistant Examiner* — Shuyi S. Liu
(74) *Attorney, Agent, or Firm* — HSML P.C.

(57) ABSTRACT

An apparatus (10) for removing particulates from a fluid is described. The apparatus (10) includes a rotatable vessel (12) for receiving a dirty fluid containing the particulates in suspension, the vessel (12) having a plurality of side walls (14) arranged to form a polygonal cross-sectional shape in a plane orthogonal to an axis of rotation of the vessel. The vessel (12) has a fluid inlet port (16) through which the dirty fluid enters the vessel, and a fluid outlet port (18) through which a clean fluid exits the vessel after removal of particulates. The apparatus (10) also comprises a solids discharge port (20) provided at each of the vertices of the
(Continued)

polygonal cross-section wherein, in use, when the vessel is rotated the particulates in the fluid entering the vessel (10) migrate to the vertices, from where they can be discharged through the discharge ports.

22 Claims, 5 Drawing Sheets

(51) Int. Cl.
    *B04B 7/02*     (2006.01)
    *B04B 7/08*     (2006.01)
    *E21B 21/06*     (2006.01)

(56) References Cited

U.S. PATENT DOCUMENTS

| | | | |
|---|---|---|---|
| 2,664,905 A | 1/1954 | Harstick | |
| 3,369,742 A * | 2/1968 | Weiland | B04B 1/14 251/86 |
| 6,234,949 B1 * | 5/2001 | Cox | B04B 5/005 494/67 |
| 2004/0262213 A1 * | 12/2004 | Kirker | B04B 1/10 210/368 |
| 2019/0210314 A1 * | 7/2019 | Sands | B30B 9/127 |

FOREIGN PATENT DOCUMENTS

| | | | | |
|---|---|---|---|---|
| GB | 1412805 A | * | 11/1975 | B04B 1/00 |
| GB | 297914 | | 10/1998 | |

OTHER PUBLICATIONS

Second Office Action issued in corresponding Chinese Patent Application No. 201980008086.3, dated Apr. 14, 2023, 16 pages.
International-type Search Report issued in Australian Application No. 2018900483, dated Jun. 29, 2018, 11 pages.
International Search Report and The Written Opinion of the International Searching Authority issued in International Application No. PCT/AU2019/050041, dated Feb. 22, 2019, 10 pages.
Office Action issued in corresponding African patent application No. AP/P/2020/012500, dated Apr. 7, 2022, 4 pages.

\* cited by examiner

METHOD AND APPARATUS UTILIZING SOLIDS DISCHARGE PORTS WITH DUMP GATES FOR REMOVING PARTICULATES FROM A FLUID

FIELD OF THE INVENTION

The present invention relates to a method and apparatus for removing particulates from a fluid and relates particularly, though not exclusively, to such a method and apparatus for removing cuttings from drilling fluid during diamond core drilling in mineral exploration.

BACKGROUND TO THE INVENTION

In most conventional drilling operations, water-based drilling fluid is recirculated or recycled. Furthermore, used drilling fluid preferably undergoes cleaning and solids separation prior to being treated as waste on-site or being transferred to approved waste stations. In most cases, large in-ground sumps are excavated and used as settling ponds where drill solids can settle prior to the fluid being recirculated down the drill string. These sumps incur a large cost to construct and remediate, and are becoming unacceptable from an environmental perspective. Additionally, large volumes of water are traditionally used, and industry is moving towards conservation of this resource.

Conventional SCE (solids control equipment) which utilises vibrating screens and hydro-cyclones does not provide an effective means of separating fine and ultra-fine drill solids in most non-oilfield types of drilling operations e.g. mineral, coalbed methane, geotechnical drilling, etc. In some applications high-speed centrifuges have been utilised along with SCE to remove fine and ultrafine solids from the fluid. Typically, such centrifuges include a horizontally rotated cylindrical bowl, spun at high speeds 2000-4000 RPM, into one end of which the drilling fluid is fed. Centrifugal forces cause the heavier solids to migrate to an outer area of the bowl.

The separated solids are then removed from the opposing end of the bowl by means of a rotating scroll. These high-speed centrifuges are predominantly the only type of centrifuge used for non-oilfield solids removal. These high-speed centrifuges are high maintenance machinery and as such they are not technically or logistically economical for general non-oilfield applications, e.g. remote helicopter, underground, land-based mineral, and geotechnical drilling applications.

All centrifuges have a bowl that has a circumferential internal surface, so that all the solid material will build up within the bowl with uniform distribution around the internal circumference of the bowl.

Most centrifuges used to clean drilling fluids are a scroll-type centrifuge which are high speed, high gravity, and short duration centrifuges, i.e. these centrifuges spin at high RPM, creating high gravity inside the bowl to separate the particulates from the fluid quickly, allowing the fluid to be retained in the bowl for a shorter period of time. These high-speed centrifuges have a smaller bowl volume, since when spinning a bowl at 2000-4000 RPM the engineering levels and energy required is much higher.

The present invention was developed with a view to providing a method and apparatus for removing particulates from a fluid that requires lower levels of engineering, resulting in lower costs and reduced levels of energy to drive the apparatus. Although the invention will be described primarily with reference to the removal of cuttings from drilling fluids in mineral exploration drilling, it will be understood that the invention has wider application and could also be used for removing particulates from other kinds of fluids.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided an apparatus for removing particulates from a fluid, the apparatus comprising:

a rotatable vessel for receiving a dirty fluid containing the particulates in suspension, the vessel having a plurality of side walls arranged to form a polygonal cross-sectional shape in a plane orthogonal to an axis of rotation of the vessel, a fluid inlet port through which the dirty fluid enters the vessel, and a fluid outlet port through which a clean fluid exits the vessel after removal of particulates;

a solids discharge port provided at each of the vertices of the polygonal cross-section wherein, in use, when the vessel is rotated the particulates in the fluid entering the vessel migrate to the vertices, from where they can be discharged through the discharge ports.

Preferably the side walls are substantially planar and are arranged to form a regular convex polygonal cross-section. Preferably the polygonal cross-section has between three to six sides. More typically the polygonal cross-section has four sides. Advantageously the side walls are arranged to form a polyhedron. Preferably the side walls form a uniform polyhedron. Preferably the vertices all lie in a symmetry orbit of the polyhedron.

Preferably each discharge port is provided with a dump gate which is movable between an open and a closed position to open and close the respective discharge port. Preferably each dump gate is biased towards the open position. Advantageously a spring is provided in connection with each dump gate to bias it towards the open position. Preferably each dump gate is also provided with a counterweight that causes the dump gate to move towards the closed position when a rotational speed of the vessel reaches a threshold speed value. Advantageously the mass of each counterweight is variable so that the rotational speed at which discharge occurs can be varied.

Typically the vessel has a volume of between 150 litres to 250 litres. More typically the vessel has a volume of about 200 litres.

Preferably the apparatus further comprises a central elongate drive shaft, which is adapted to be driven by a suitable drive motor, the drive shaft being provided in connection with the vessel, and extending through the vessel on its axis of rotation. Preferably the drive motor is a hydraulic motor. Preferably the drive shaft is hollow and the fluid inlet port is provided at a first end of the drive shaft which is external to the vessel. Preferably a fluid discharge port is provided in the drive shaft within the vessel to allow the fluid flowing into the fluid inlet to enter the vessel. Preferably the drive shaft rotates about a substantially vertical axis of rotation. Preferably the first end of the drive shaft is provided at a top of the vessel, and the fluid discharge port is provided just below the fluid inlet port adjacent to the top of the vessel.

Advantageously the side walls of a top half of the vessel, and the side walls of a bottom half of the vessel, are both respectively made from two sheets of steel plate. Preferably the two sheets of steel plate are formed into the shape of half an octahedron and welded together along join lines to form an octahedron.

In a preferred embodiment the apparatus further comprises a support frame within which the vessel is rotatably supported.

According to another aspect of the present invention there is provided a method of removing particulates from a fluid, the method comprising the steps of:

rotating a rotatable vessel having a plurality of side walls arranged to form a polygonal cross-sectional shape in a plane orthogonal to an axis of rotation of the vessel, the vessel having a fluid inlet port and a fluid outlet port;

receiving a dirty fluid containing the particulates in suspension into the rotating vessel, the dirty fluid entering the vessel through a fluid inlet port so that the particulates in the dirty fluid migrate to the vertices of the polygonal cross-section;

exiting a clean fluid from the vessel through the fluid outlet port after removal of particulates; and, discharging the particulates through a solids discharge port provided at each of the vertices.

Preferably when the dirty fluid enters the vessel the speed of rotation of the vessel is at a first rotational speed. Typically when dirty fluid is no longer entering the vessel, the speed of rotation of the vessel is slowed to a second rotational speed that allows discharge gates at each discharge port to open, and the solids are discharged out of the vessel through the solids discharge ports.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the method and apparatus for removing particulates, given by way of example only, with reference to the accompanying drawings, in which.

DETAILED DESCRIPTION OF PREFERRED EMBODIMENTS

Figure 1:
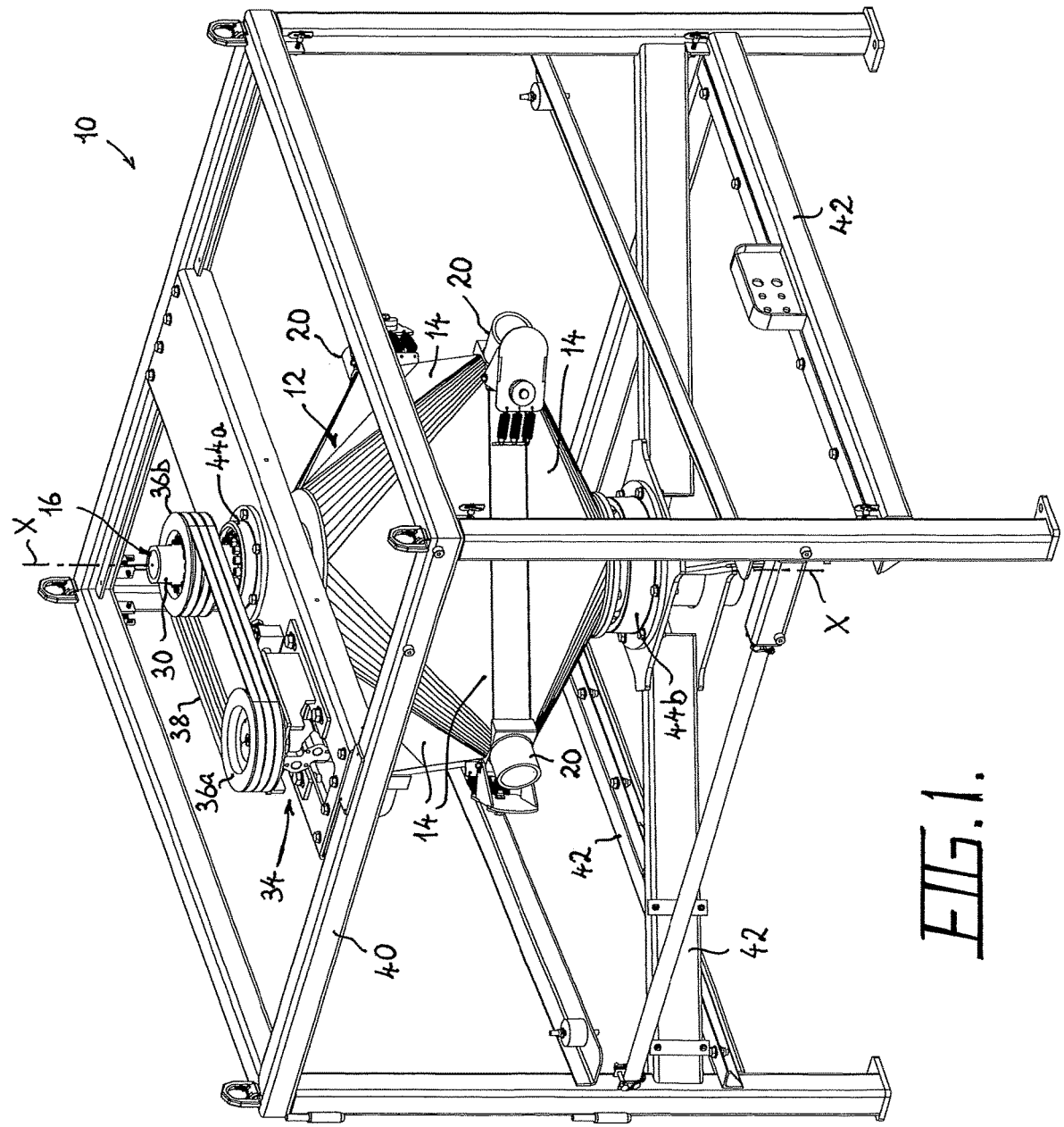
FIG. 1 is a top perspective view of a first embodiment of the apparatus for removing particulates in accordance with the present invention.

A preferred embodiment of the apparatus 10 for removing particulates from a fluid in accordance with the invention, as illustrated in FIGS. 1 to 5, comprises a rotatable vessel or bowl 12 for receiving a dirty fluid containing the particulates in suspension. The vessel 12 has a plurality of side walls 14 arranged to form a polygonal cross-sectional shape in a plane orthogonal to an axis of rotation X-X of the vessel 12. As can be inferred most readily from FIGS. 2 and 4, the polygonal cross-sectional shape of the vessel 12, in a plane orthogonal to the axis of rotation X-X, is a square, i.e. an equilateral rectangle. However it should be understood that the polygonal cross-sectional shape of the vessel could be of any suitable polygonal shape, including a triangle, a pentagon, a hexagon, etc.

Preferably the side walls 14 are substantially planar and are arranged to form a vessel with a regular convex polygonal cross-section, in this case a square. As will become clearer below, preferably the polygonal cross-section has between three to six sides so that the angles at the vertices do not become too large. More typically the polygonal cross-section has four sides, as in the illustrated embodiment.

Advantageously the side walls 14 are arranged to form a polyhedron. Preferably the side walls 14 form a uniform polyhedron. Preferably the vertices all lie in a symmetry orbit of the polyhedron. In the illustrated embodiment the uniform polyhedron is an octahedron, i.e. an eight-sided regular polyhedron. The vessel 12 of the illustrated embodiment is thus in the shape of an octahedron. Preferably the side walls 14 of a top half of the vessel 12, and the side walls of a bottom half of the vessel 12, are both respectively made from two sheets of steel plate, formed into the shape of half an octahedron and welded together along join lines 15. Preferably the two halves of the octahedron are welded to respective circular end plates 17 and 19, provided at a top and a bottom of the vessel 12 respectively, as can be seen most clearly in FIGS. 4 and 5.

The vessel 12 is provided with a fluid inlet port 16 through which the dirty fluid enters the vessel 12, and a fluid outlet port 18 through which a clean fluid exits the vessel after removal of particulates. A solids discharge port 20 is provided at each of the vertices of the polygonal cross-section. In use, when the vessel 12 is rotated the particulates in the fluid entering the vessel migrate to the vertices, from where they can be discharged through the discharge ports.

It will be understood that the apparatus 10 operates like a centrifuge, in that the particulates in suspension in the dirty fluid migrate away from the axis of rotation under the action of centrifugal forces. However the apparatus 10 differs from all other centrifuges used to clean drilling fluids, due to the uniquely shaped bowl and system for discharging of the solids from the bowl. The bowl (vessel 12) for this centrifuge is square in cross-sectional shape at the centre area so the solid particulates will accumulate in the corners (vertices) of the bowl at the discharge ports 20.

Figure 3:
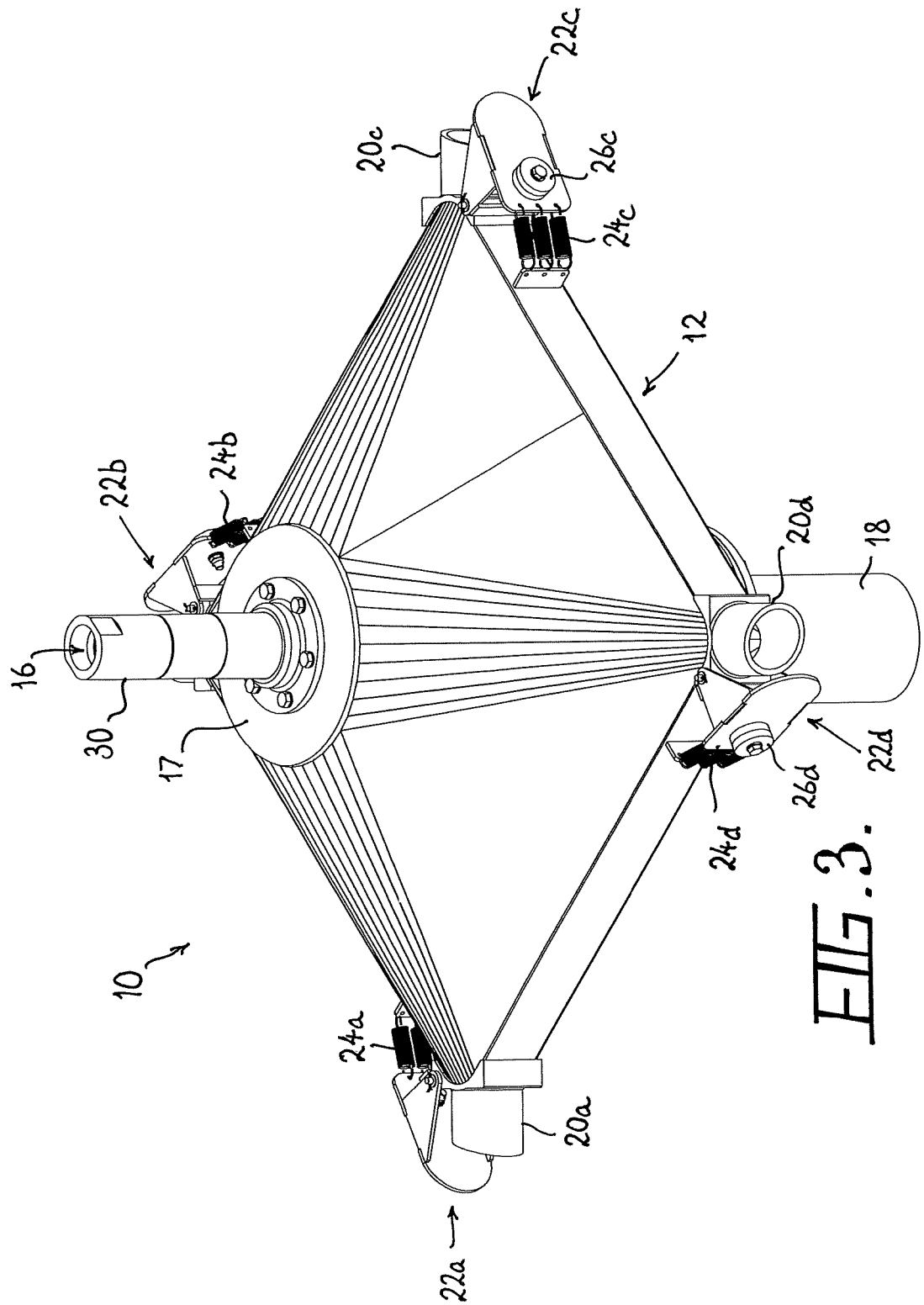
FIG. 3 is a top perspective view of a rotatable vessel in the apparatus of FIG. 1, shown without the support frame for simplicity.
Figure 4:
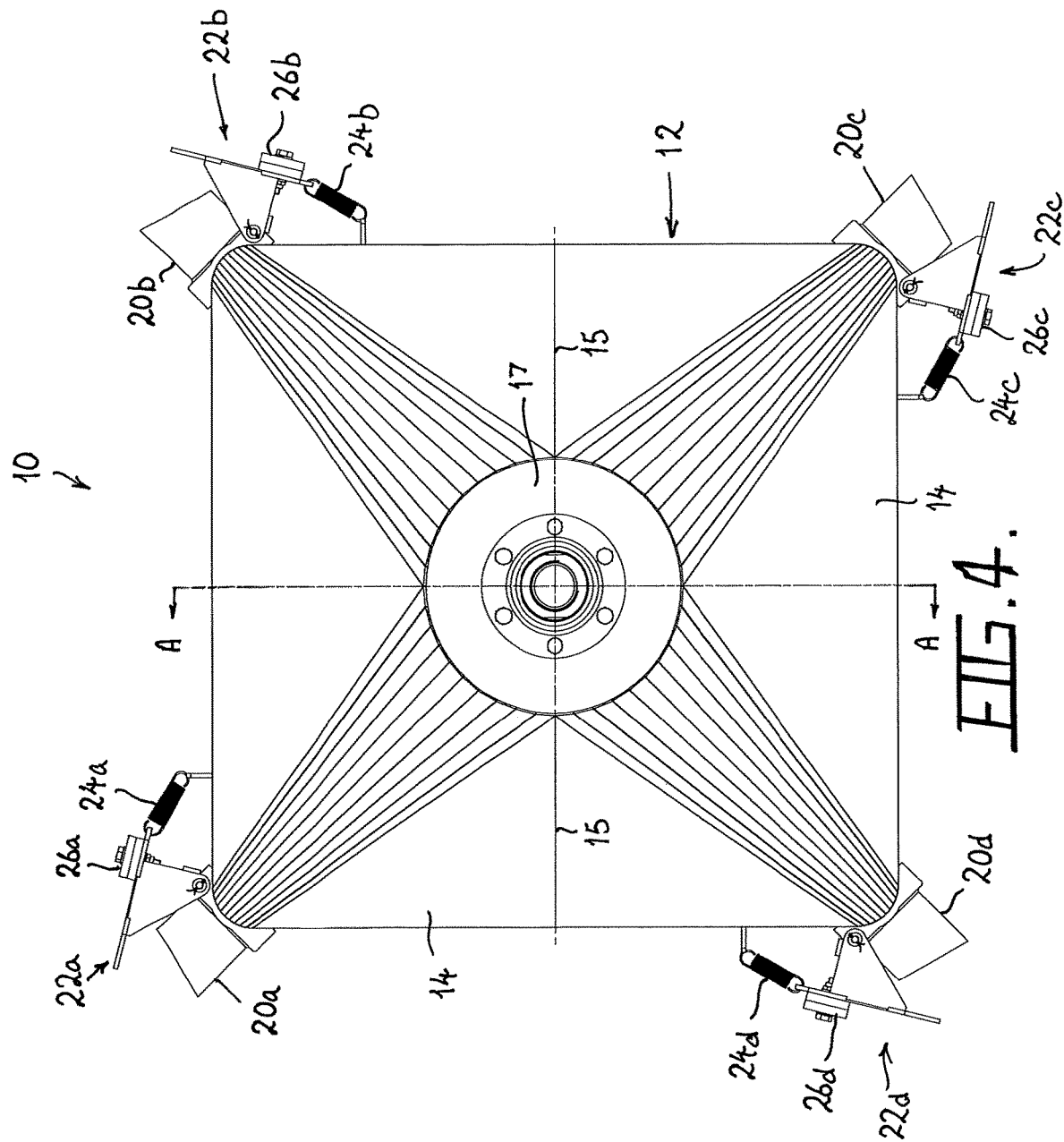
FIG. 4 is a top plan view of the vessel illustrated in FIG. 3.
Figure 5:
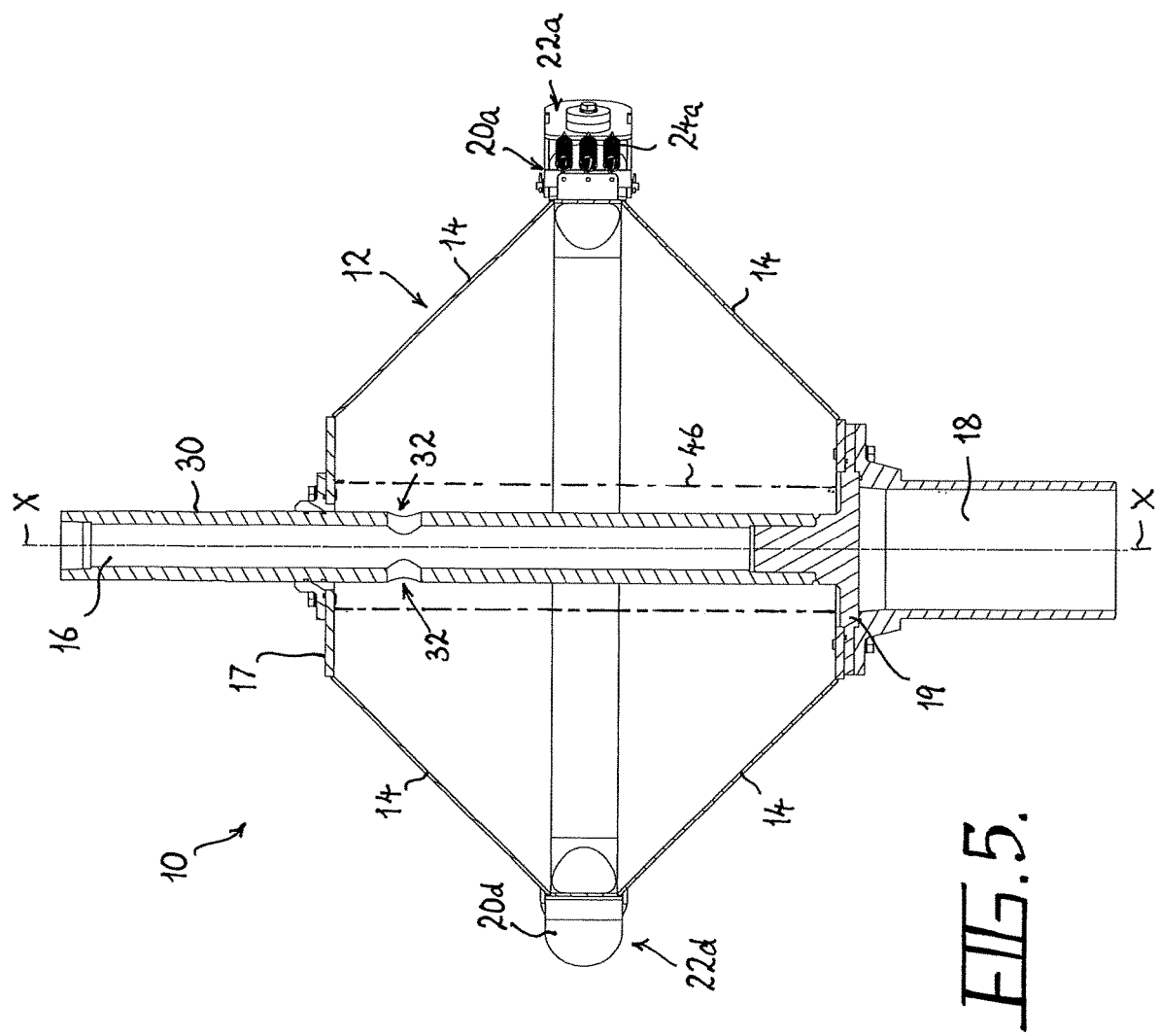
FIG. 5 is a cross-section view through the line A-A of the vessel illustrated in FIG. 4.

Preferably each discharge port 20 is provided with a dump gate 22 which is movable between an open and a closed position to open and close the respective discharge port 20, as shown in FIGS. 3 and 4. Preferably each dump gate 22 is biased towards the open position. Advantageously a spring 24 is provided in connection with each dump gate 22 to bias it towards the open position. In the illustrated example, a coil spring 24 is shown, however it will be understood that any suitable spring, or other means of biasing the dump gate 22 to the open position may be employed. In the accompanying drawings, all four of the dump gates 22a, 22b, 22c, and 22d are in the open position. All of the damp gates 22 normally open and close more or less simultaneously. In the stationary position of the vessel 12, all of the dump gates 22 would normally be open, as shown.

Preferably each dump gate 22 is also provided with a counterweight 26 that causes the dump gate to move towards a closed position when a rotational speed of the vessel reaches a threshold value. This threshold value will depend on the force required to move the mass of the counterweight 26, as it is acted upon by centrifugal forces, to overcome the biasing force of the spring 24. As the rotational speed of the vessel 12 increases, so too the centrifugal forces acting on the counterweight 26 increase. The dump gates 22 stay open until the desired rotational speed is reached. When the vessel 12 is rotating at the desired velocity, the dump gates 22 close under the influence of centrifugal force, sealing the centrifuge shut and allowing the dirty fluid with the solid particulate to be retained in the vessel 12. The rotational speed (RPM) at which the dump gates 22 open or close, can be varied by removing or adding more mass (weights) to the counterweight 26. It is easily adjusted on site to suit the particle size of the particulate it is desired to remove from the dirty fluid.

Being able to vary the rotational speed at which the discharge ports 20 open has a number of advantages. Firstly, if the solid particulates do tend to pack off in the discharge ports 20 then reducing the counterweights will allow the dump gates 22 to open at higher speeds, which in turn will force the solid particulates to be discharged under greater centrifugal force, thus alleviating the problem with packing. Secondly, when drilling is slow and there are less cuttings in the bowl (vessel 12), opening the dump gates 22 as late as possible during the cleaning cycle will discharge less fluid and keep the discharge dryer.

The vessel 12 is typically rotated to a rotational speed of 400-600 RPMs in normal operating conditions. This is an important difference between the present invention and most prior art decanting centrifuges. Most prior art decanting or sedimenting centrifuges operate at high speed, and short duration (of fluid/slurry in the bowl). Typically, decanting centrifuges used in oilfield applications rotate at speeds of between 1000-4000 RPM and typically generate G-forces of between 500-1000 G's. More expensive "high G" machines can generate up to 3000 G's. However prior art decanting centrifuges come at a high cost, because the design and manufacture of the bowl requires significant engineering in order to withstand such high G's. These types of prior art decanting centrifuges are designed to remove particulates with a particle size below 50 microns.

By way of contrast, the apparatus 10 is designed to operate at a maximum rotational speed of about 1000 RPM, and more typically operates in the range of 100 to 500 RPM. It typically generates G-forces of up 175 G's. It is designed for low speed and long duration (of the fluid in the vessel). This means that the engineering required for the design and manufacture of the apparatus 10 is much less stringent. The apparatus 10 of the present invention is primarily designed to remove particulates with an average particle size falling within the range of approximately 8-15 microns. In diamond core drilling the drill rod typically rotates at around 1000 RPM generating G-forces of up 127 G's. Solids in the drilling mud will 'spin out' inside the rods rotating at high speeds, and build-up to the point where the core cannot be withdrawn. The apparatus 10 is designed to primarily remove those particulates (diamond drill cuttings) which will 'spin out' and cause problems within the drill string.

Advantageously, it is also possible to vary the speed of rotation of the bowl (vessel 12) of the apparatus 10. Changing the speed of the bowl has advantages for the type of formation drilled. If it is hard ground and the penetration rates are slower, it may be advantageous to lower the speed of the bowl 12, so that it doesn't dewater the solids in the discharge ports 20, and have them pack off in the ports and block up. Also varying the bowl speed will dictate how fine the cut point is on removing solids. The faster the speed the finer the cut and the higher the flow rate though the apparatus 10.

Typically the bowl or vessel 12 has a volume of between 150 litres to 250 litres. More typically the vessel has a volume of about 200 litres.

Preferably the apparatus 10 further comprises a central elongate drive shaft 30, which is adapted to be driven by a suitable drive motor 34. The drive motor 34 is coupled to the drive shaft 30 by respective pulleys 36a and 36b and drive belts 38. The drive shaft 30 is provided in connection with the vessel 12, and extends through the vessel on its axis of rotation X-X. Preferably the drive motor is a hydraulic motor 34 (see FIG. 1). Preferably the drive shaft 30 rotates about a substantially vertical axis of rotation. Preferably the drive shaft 30 is hollow, and the fluid inlet port 16 is provided at a first end of the drive shaft 30 which is external to the vessel 12, as can be seen most clearly in FIGS. 1 and 3. In the illustrated embodiment the drive shaft 30 has an external diameter of about 85 mm, and an internal diameter of about 50 mm.

A dirty fluid discharge port 32 is provided in the drive shaft 30 within the vessel 12 to allow the fluid flowing into the fluid inlet port 16 to enter the vessel 12. Preferably the first end of the drive shaft 30 is provided at a top of the vessel 12, and the dirty fluid discharge port 32 is provided just below the fluid inlet port 16 adjacent to the top of the vessel, as can be seen most clearly in FIG. 5. Typically the dirty fluid discharge port 32 is one of a plurality of fluid discharge ports 32 internally machined in an upper region of the drive shaft 30.

Figure 2:
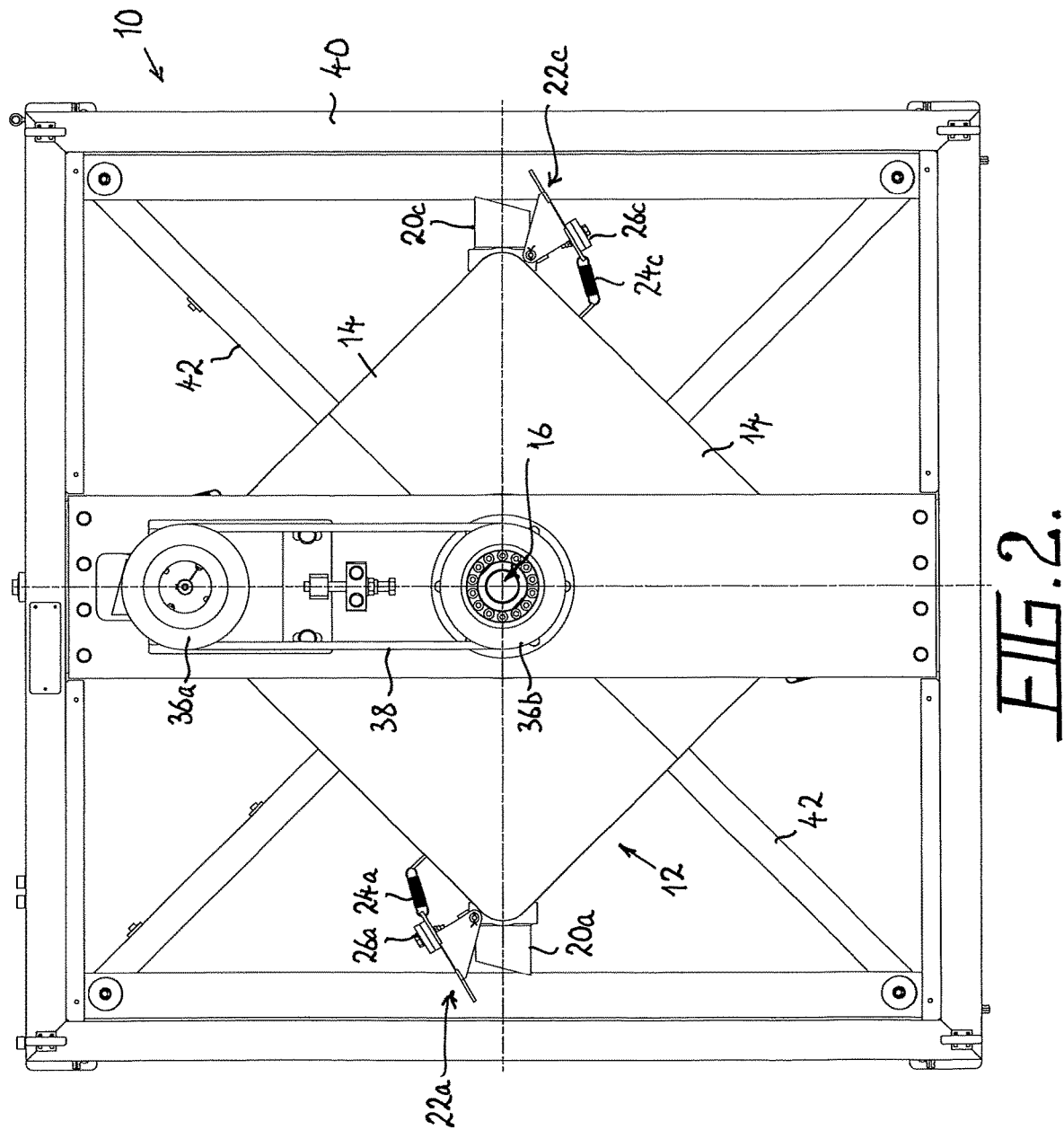
FIG. 2 is a top plan view of the apparatus of FIG. 1.

In a preferred embodiment the apparatus 10 further comprises a support frame 40 within which the vessel 12 is rotatably supported. Preferably the support frame 40 comprises a space frame in the form of a rigid, lightweight, truss-like structure constructed from interlocking struts 42 in a geometric design, as shown in FIGS. 1 and 2. Preferably the geometric design of the space frame 40 is a simple cube, which derives its strength and rigidity from the inherent rigidity of a triangle formed by diagonal struts 42. Preferably first and second bearing packs 44a and 44b are provided at a top and bottom of the space frame 40 respectively, in which the drive shaft 30 is rotatably supported.

Preferably fluid outlet port 18 is provided at the bottom of the vessel 12 to allow the clean fluid to exit from the vessel after removal of particulates. Typically the fluid outlet port is one of a plurality of outlet ports 18 machined into the bottom bearing pack 44b, through which the clean fluid exits. Preferably a catch pan (not illustrated) is provided at the bottom in which the clean fluid is caught and directed to a temporary storage tank, ready for recycling to the drill string if needed.

A preferred method of removing particulates from a drilling fluid, according to the invention, using the apparatus 10, will now be described. The method comprises the step of rotating the rotatable vessel 12. Typically, the speed of rotation of the vessel 12 is first increased to a point where the gates 22 close under the force of the counterweights 26. This enables the dirty fluid with the particulates to be retained in the vessel 12 to effect the separation of the particulates.

The method further comprises receiving a dirty fluid containing the particulates in suspension into the rotating vessel 12. The drilling fluid enters through the fluid inlet port 16 on drive shaft 30 of the vessel 12 via a water swivel (not illustrated) mounted to the top of the shaft 30. The fluid exits the shaft 30 and enters the vessel via the internally machined fluid discharge ports 32 at the upper most level internally of the vessel 12.

Typically, when the dirty fluid first begins to enter the vessel 12 the speed of rotation of the vessel is at around 500 RPM. As the vessel 12 rotates the particulates in the dirty fluid entering the vessel will migrate to the vertices of the polygonal cross-section, i.e. to each of the corners of the vessel 12 where the dump gates 22 are located. Heavier dense fluid is forced to the outer corners of the vessel 12, where the centrifugal forces are greatest, and lighter clean fluid is forced inwards towards the centre of the vessel 12. It is in this region that the solid particulates are separated from the liquid.

The particulates accumulate in the corners of the vessel 12 awaiting discharge. Typically an annulus 46 of air forms around the central drive shaft 30 inside the vessel 12 as it spins. The inside diameter of this annulus 46 corresponds approximately to the inside diameter of the fluid outlet port 18 (see FIG. 5).

When the centrifuge vessel 12 is full of drilling fluid the lighter cleaned fluid moves towards the centre of the vessel where it leaves the centrifuge via the fluid outlet port 18 in the bottom section of the vessel, at the same time as additional dirty fluid enters the vessel through the fluid discharge ports 32. Clean fluid is collected below the centrifuge vessel 12 in a clean fluid transfer tank and pumped into the active recirculating system or directly back to the drill rig.

The vessel 12 will typically spin for the duration of time taken to drill the length off the drill rod, or when the circulation of the drilling fluid is stopped. When the circulation of the drilling fluid is stopped a float control switch, located at the drill collar, controls the rotation speed of the centrifuge vessel 12. The vessel will slow to a speed that allows the discharge gates to open, typically at around 50-100 rpm. Under centrifugal force the accumulated particulates form a compacted conglomerate of solid material in the four corners of the vessel. When rotation is slowed allowing the dump gates 22 to open, the solids are discharged out of the centrifuge vessel 12 through the solids discharge ports 20 into a vibratory catch pan, (not illustrated) that moves the conglomerated solids into a discharge shoot for collection.

A significant advantage of the centrifugally operated dump gates 22 is that the rotational speed of the vessel 12 at which discharge occurs can be varied by adjusting the mass of each of the counterweights 26. As the mass of the counterweights 26 is increased, the dump gates 22 will open at progressively lower speeds.

After use, the vessel 12 can be cleaned with a quick flush of clean water while it is spinning at low speed with the dump gates 22 in the open position.

Now that a preferred embodiment of the method and apparatus for removing particulates from a fluid has been described in detail, it will be apparent that the described embodiment provides a number of advantages over the prior art, including the following:
 (i) There is only one moving part (vessel 12) which needs to be driven by an external power source.
 (ii) It is a relatively slow rotational speed centrifuge, so that the engineering required is much less stringent, reducing both manufacturing and maintenance costs.
 (iii) Advantageously it is all operated by hydraulics, which is much easier and safer to work with in a drilling environment than electrics.
 (iv) It is easy to clean, simply by doing a low speed cleaning cycle.

It will be readily apparent to persons skilled in the relevant arts that various modifications and improvements may be made to the foregoing embodiments, in addition to those already described, without departing from the basic inventive concepts of the present invention. For example, the support structure need take the form of a space frame, and could, for example, be part of an existing drill rig structure. Therefore, it will be appreciated that the scope of the invention is not limited to the specific embodiments described.

The invention claimed is:

1. An apparatus for removing particulates from a fluid, the apparatus comprising:
 a rotatable vessel for receiving a dirty fluid containing the particulates in suspension, the rotatable vessel having a plurality of side walls arranged to form a polygonal cross-sectional shape in a plane orthogonal to an axis of rotation of the rotatable vessel, a fluid inlet port through which the dirty fluid enters the rotatable vessel, and a fluid outlet port through which a clean fluid exits the rotatable vessel after removal of the particulates, the polygonal cross-section shape having vertices;
 solids discharge ports, each of the vertices of the polygonal cross-section shape provided with a respective one of the solids discharge ports, wherein, in use, when the rotatable vessel is rotated the particulates in the dirty fluid entering the rotatable vessel migrate to the vertices, from where the particulates can be discharged through the solids discharge ports; and
 dump gates for the solids discharge ports, each of solids discharge ports provided with a respective one of the dump gates, wherein each of the dump gates is movable between an open position and a closed position to open and close the respective one of the solids discharge ports, and each of the dump gates is biased towards the open position and is respectively provided with a counterweight that causes the dump gate to move towards the closed position when a rotational speed of the rotational vessel reaches a threshold speed value, wherein a mass of the respective counterweight of each of the dump gates is variable so that the rotational speed at which discharge occurs can be varied.

2. The apparatus of claim 1, wherein the side walls are substantially planar and are arranged to form a regular convex polygonal cross-section.

3. The apparatus of claim 2, wherein the polygonal cross-section has between three to six sides.

4. The apparatus of claim 3, wherein the polygonal cross-section has four sides.

5. The apparatus of claim 1, wherein the side walls are arranged to form a polyhedron.

6. The apparatus of claim 5, wherein the side walls form a uniform polyhedron.

7. The apparatus of claim 6, wherein the vertices all lie in a symmetry orbit of the uniform polyhedron.

8. The apparatus of claim 1, wherein a spring is respectively provided in connection with each of the dump gates to bias each of the dump gates towards the open position.

9. The apparatus of claim 1, wherein the rotatable vessel has a volume of between 150 litres to 250 litres.

10. The apparatus of claim 9, wherein the rotatable vessel has a volume of about 200 litres.

11. The apparatus of claim 1, further comprising:
 a central elongate drive shaft, which is adapted to be driven by a suitable drive motor, the central elongate drive shaft being provided in connection with the rotatable vessel, and the central elongate drive shaft extending through the rotatable vessel on the axis of rotation.

12. The apparatus of claim 11, wherein the drive motor is a hydraulic motor.

13. The apparatus of claim 11, wherein the central elongate drive shaft is hollow and the fluid inlet port is provided at a first end of the central elongate drive shaft which is external to the rotatable vessel.

14. The apparatus of claim 11, wherein a fluid discharge port is provided in the central elongate drive shaft within the rotatable vessel to allow the dirty fluid flowing into the fluid inlet to enter the rotatable vessel.

15. The apparatus of claim 11, wherein the central elongate drive shaft rotates about a substantially vertical axis of rotation.

16. The apparatus of claim 14, wherein the first end of the central elongate drive shaft is provided at a top of the rotatable vessel, and the fluid discharge port is provided just below the fluid inlet port adjacent to the top of the rotatable vessel.

17. The apparatus of claim 6, wherein the side walls of a top half of the rotatable vessel, and the side walls of a bottom half of the rotatable vessel, are both respectively made from two sheets of steel plate.

18. The apparatus of claim 17, wherein the two sheets of steel plate are formed into the shape of half an octahedron and welded together along join lines to form an octahedron.

19. The apparatus of claim 1, w further comprising:
a support frame within which the rotatable vessel is rotatably supported.

20. A method of removing particulates from a fluid, the method comprising:
rotating a rotatable vessel having a plurality of side walls arranged to form a polygonal cross-sectional shape in a plane orthogonal to an axis of rotation of the rotatable vessel, the rotatable vessel having a fluid inlet port and a fluid outlet port;
receiving a dirty fluid containing the particulates in suspension into the rotating vessel, the dirty fluid entering the rotatable vessel through the fluid inlet port so that the particulates in the dirty fluid migrate to vertices of the polygonal cross-sectional shape;
exiting a clean fluid from the rotatable vessel through the fluid outlet port after removal of particulates;
discharging the particulates through solids discharge ports provided at the vertices, which includes opening dump gates for the solids discharge ports, each of the vertices provided with a respective one of the solids discharge ports, each of the solids discharge ports provided with a respective one of the dump gates, and each of the dump gates being movable between an open position and a closed position to open and close the respective one of the solid discharge ports;
biasing each of the dump gates towards the open position, and causing each of the dump gates to move towards the closed position via a respective counterweight when a rotational speed of the rotational vessel reaches a threshold speed value; and
adjusting a mass of the respective counterweight for each of the dump gates so that the rotational speed at which the discharging occurs is varied.

21. The method of claim 20, wherein when the dirty fluid enters the rotatable vessel the rotational speed of the rotatable vessel is a first rotational speed.

22. The method of claim 21, wherein when the dirty fluid is no longer entering the rotatable vessel, the rotational speed of the rotatable vessel is slowed to a second rotational speed that allows the dump gate at the solids discharge port at each of the vertices to open, and the particulates are discharged out of the rotatable vessel through the solids discharge ports.

* * * * *